May 20, 1941.　　　M. H. HANSEN　　　2,242,949
WEIGHING SCALE
Filed Nov. 10, 1937　　　3 Sheets-Sheet 1
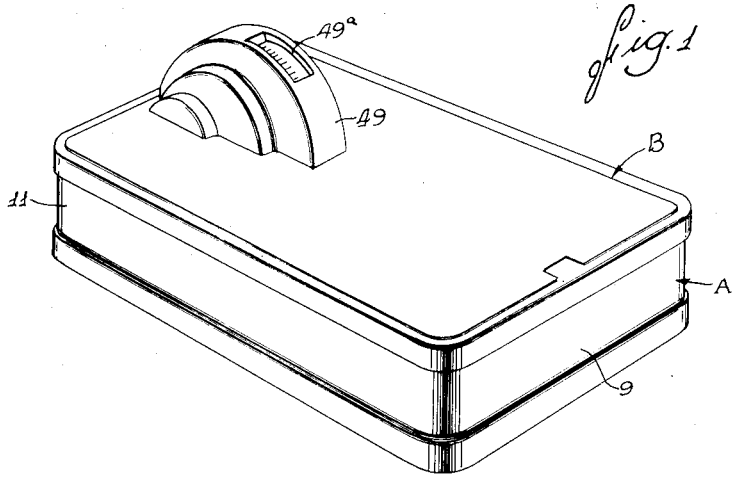
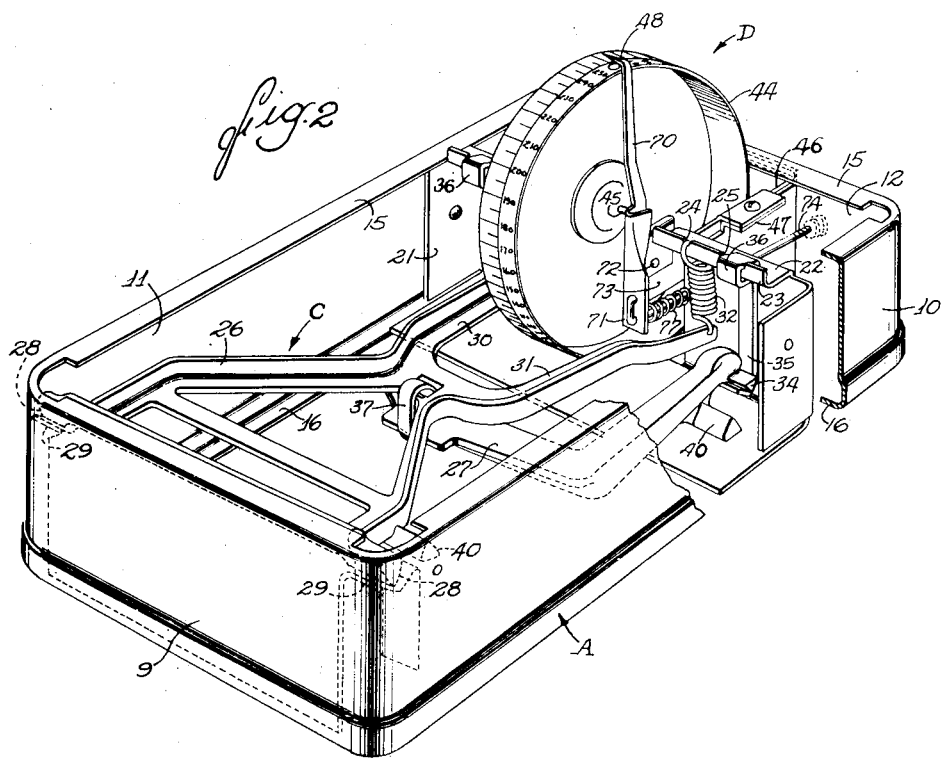
INVENTOR
Marius H. Hansen
By Parker, Carter, Plymar & Hubbard
ATTORNEYS

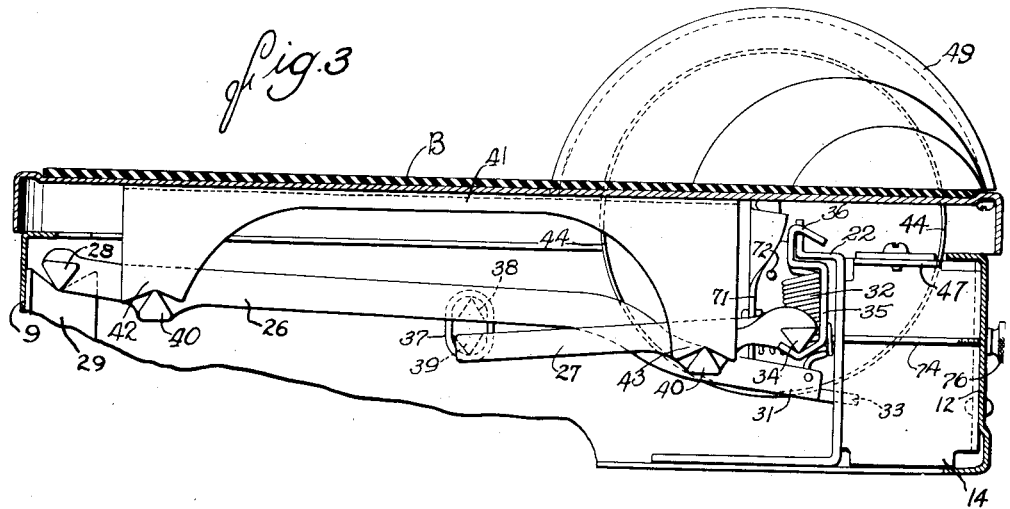

May 20, 1941.  M. H. HANSEN  2,242,949
WEIGHING SCALE
Filed Nov. 10, 1937  3 Sheets-Sheet 3
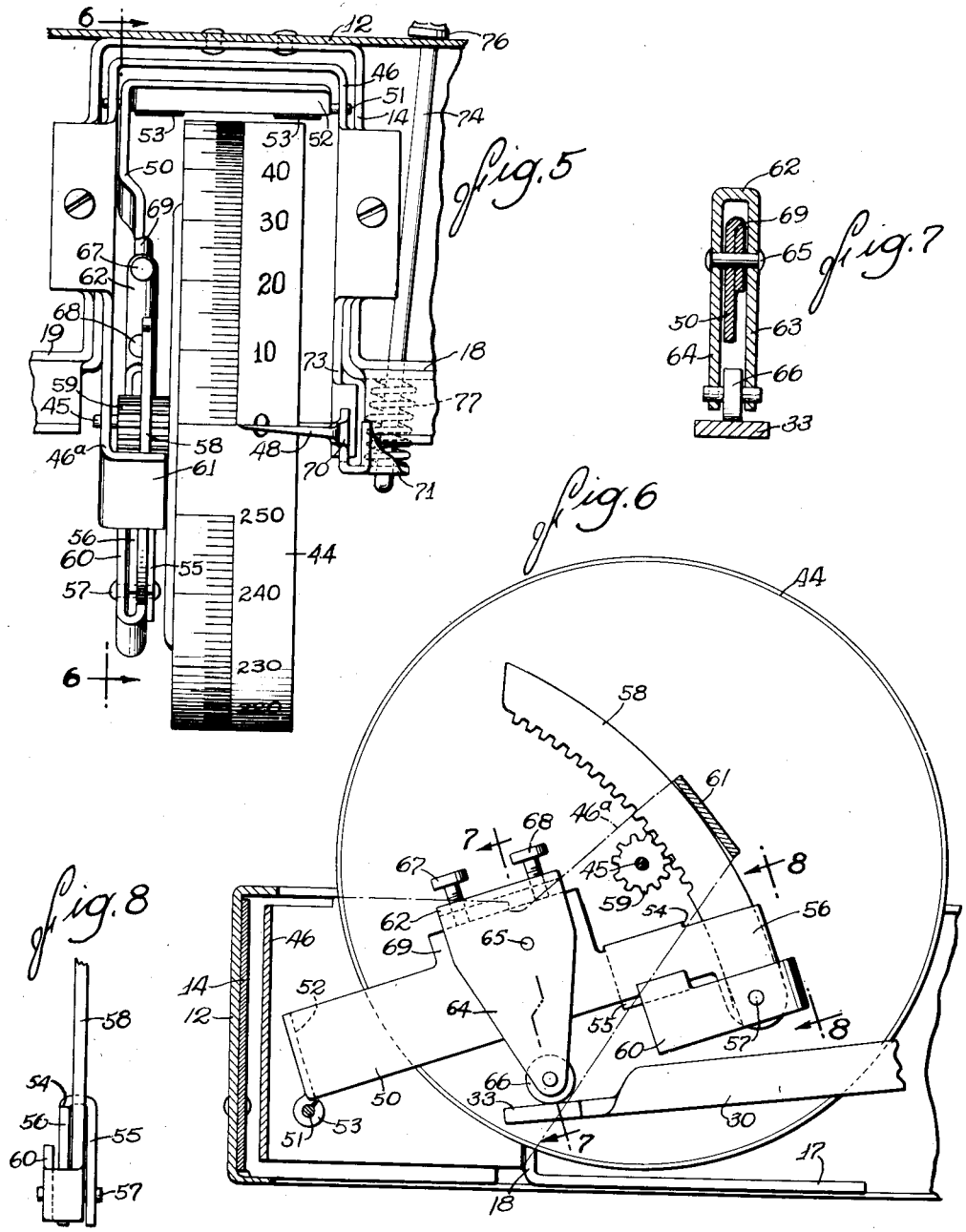
INVENTOR
Marius H. Hansen
ATTORNEYS Patented May 20, 1941

2,242,949

UNITED STATES PATENT OFFICE 2,242,949

WEIGHING SCALE

Marius H. Hansen, Chicago, Ill., assignor, by mesne assignments, to Hanson Scale Company, a corporation of Illinois Application November 19, 1937, Serial No. 173,739

11 Claims. (Cl. 265—68)

The invention relates generally to weighing scales and more particularly to scales of the class commonly known as "bathroom" scales.

The primary object of the invention is to provide an improved scale of the above general character which is inexpensive to manufacture and yet extremely accurate in operation, and which is capable of withstanding rough usage without getting out of order.

Another object is to provide novel means for transmitting the motion of the weighing mechanism to the indicator of the scale which can be quickly and accurately adjusted or calibrated to enable the indicator to respond properly to the action of the weighing mechanism for accurate registration.

Still another object is to provide an improved indicating mechanism including a movable dial or drum and a relatively stationary pointer both of which are mounted on the supporting framework of the scale and entirely independent of the platform, and embodying novel means for shifting the pointer relatively to the scale to adjust the zero position of the indicator whereby adjustments of the moving parts of the indicator are avoided.

A further object is to provide a novel scale mechanism in which the motion-transmitting mechanism for the indicator is held in operative engagement with the weighing mechanism solely by gravity, thereby avoiding the use of springs and effectively preventing injury to the indicator mechanism through violent movements of the scale platform.

A more specific object is to simplify the manufacture and assembly of the scale by the provision of an indicator and motion-transmitting mechanism constructed as a unit for convenient assembly with the other elements of the scale.

Other objects and advantages of the invention will become apparent from the detailed description of the preferred embodiment illustrated in the accompanying drawings, in which:

Figure 1 is a perspective view of a weighing scale embodying the features of the invention.

Fig. 2 is a perspective view of the scale with the platform removed to show the general arrangement of the weighing and indicating mechanism.

Fig. 3 is a vertical sectional view taken longitudinally of the scale.

Fig. 4 is a fragmentary end view of the base showing the reinforcing and supporting framework.

Fig. 5 is a plan view of the indicator mechanism.

Fig. 6 is an elevational view of the indicator mechanism taken along the line 6—6 of Fig. 5.

Fig. 7 is a sectional view taken along the line 7—7 of Fig. 6 showing details of the means for adjusting the motion-transmitting mechanism.

Fig. 8 is a fragmentary end view of the motion-transmitting arm and associated rack showing the manner in which the parts are connected together.

Referring more particularly to Figs. 1 and 2 of the drawings, the scale selected to illustrate the invention comprises generally a casing or base A, a platform B having substantially the same perimetral outline as the base, a weighing mechanism C enclosed within the base and arranged to support the platform, and an indicator mechanism D operatively associated with the weighing mechanism. In the present instance, the motion-transmitting mechanism which provides the operative connection between the indicator and the weighing mechanism is constructed with and forms part of the indicator mechanism unit.

As herein shown, the base A comprises a perimetral wall member preferably stamped from an integral piece of sheet metal to form a front wall 9, side walls 10 and 11, and a rear wall 12. The ends of the wall member are arranged to meet in abutting relation substantially at the center of the rear wall 12 as shown in Fig. 4. To facilitate assembly, the ends of the member are arranged to be riveted or otherwise secured to a web 13 of a generally U-shaped bracket 14 which forms a part of the indicator and weighing mechanism supporting framework to be described hereinafter. The upper and lower edges of the wall member are formed with inwardly projecting flanges 15 and 16 to provide a strong and rigid structure.

The indicator and weighing mechanism supporting framework may be conveniently made in two parts assembled together as a unit for subsequent assembly with the wall member of the base. The U-shaped bracket 14 above referred to constitutes one of these parts, the other part comprising a member adapted to extend transversely of the base as shown in Fig. 4. The transverse member preferably comprises a flat bottom plate 17 having upturned webs 18 and 19 formed along one edge. The adjacent vertical edges of the webs are bent rearwardly as at 20, for attachment to the legs of the bracket 14, Such attachment may be made by riveting or spot welding.

The outer vertical edges of the webs 18 and 19 are formed with forwardly projecting flanges 21 adapted to lie against the side walls 10 and 11 of the base and to be riveted or otherwise rigidly secured thereto. The transverse member, U-shaped bracket and wall member, when assembled together, constitute a framework for supporting the entire scale mechanism.

Referring now to Figs. 3 and 4, the upper edges of the webs 18 and 19 are formed with forwardly extending flanges 22 and on the forward end of each of said flanges is an upwardly extending flange 23 having notches 24 and 25 for receiving certain parts of the weighing mechanism as will appear presently.

The weighing mechanism C comprises two levers 26 and 27. The lever 26 is provided at its forward end with two downwardly facing knife-edge bearings 28 adapted to be supported in V-shaped bearings 29 mounted on the front wall 9 of the base, and its rearward end is bifurcated to form spaced arms 30 and 31 extending below the flanges 23 of the webs 18 and 19. These arms are yieldably supported on the flanges by means of resistor springs 32 which hook into the notches 24. An inwardly offset lug 33 on the arm 30 is arranged to project between the webs 18 and 19 for cooperation with indicator mechanism to be described presently.

The lever 27 is in the form of a yoke and each leg is provided with a knife-edge bearing 34 adapted to rest in a V-shaped bearing formed on the lower end of a hanger 35. Each of the hangers 35 is formed of an integral piece of sheet metal, the lower end of which is bent to form the V-shaped bearing for the lever while the upper end is bent to form a hook 36 adapted to engage in one of the notches 25. The forward end of the lever 27 is suspended from the midpoint of the lever 26 by means of a loop 37 engaging knife-edge bearings 38 and 39 on the respective levers as shown in Fig. 3.

The levers 26 and 27 are formed with suitable upwardly facing knife-edge bearings 40 for supporting the platform B. To this end, the platform has secured to its underside two sheet metal brackets 41 each formed to provide a front V-shaped bearing 42 and a rear V-shaped bearing 43 adapted to rest on the knife edges 40. Thus, when a weight is placed on the platform, the levers 26 and 27 are rocked about their fulcrums, and the free end of the first mentioned lever terminating in the lug 33 is depressed in proportion to the weight on the platform.

Referring now to Figs. 2, 5 and 6, the indicator mechanism D includes a dial in the form of a light cylindrical drum 44 mounted on a horizontal shaft 45 journaled in forwardly and upwardly projecting webs 46ª of a generally U-shaped frame 46 adapted to be removably supported on flanges 47 of the bracket 14. The periphery of the drum 44 is suitably marked to represent the various weights to be registered. A relatively stationary pointer 48 is arranged to cooperate with the drum.

In the preferred form, the dial or drum 44 is of relatively large diameter so that the unit markings may be easily read by a person standing on the platform B. Moreover, with the large diameter drum, the markings may be spaced sufficiently far apart to permit accurate registration of fractions of a pound. The drum thus projects substantially above the level of the platform B, the platform being provided with a suitable opening for receiving the drum. A housing 49 having a transparent window 49ª enclosing the projecting part of the drum and the pointer 48 is mounted on the platform as shown in Figs. 1 and 3. Sufficient clearance is provided between the drum and the housing so that the parts do not touch when the platform is fully depressed.

The means for transmitting the motion of the weighing mechanism to the dial drum 44 comprises an arm 50 pivoted at its rear end on a horizontal shaft 51 journaled on the frame 46. The arm may be conveniently stamped from sheet metal and, as herein shown (Figs. 5 and 6), comprises a rear bearing portion 52 extending at right angles to the arm proper. The lower edge of the bearing portion 52 is formed with spaced ears 53 adapted to be crimped around the shaft 51.

The forward end of the arm 50 is notched as at 54 and folded longitudinally upon itself to form spaced side members 55 and 56. Pivoted between the two side members on a pivot pin 57 is an arcuate rack 58 adapted to mesh with a pinion 59 fast on the shaft 45 which carries the drum 44.

Referring to Fig. 8, it will be observed that the lower end of the rack 58 is formed with an angular extension 60 which is bent forwardly and then rearwardly so that the major portion of the extension lies behind the pivotal point of the rack. The weight of the extension thus tends to hold the rack in engagement with the pinion, thereby effectively eliminating all backlash between the meshing teeth of the parts. Since the engagement of the parts is effected solely by the action of gravity, the rack is enabled to yield readily to accommodate itself to small irregularities in the engaging surfaces. Moreover, any possibility of the parts binding in the operation of the scale is avoided so that the sensitivity of the indicating mechanism remains uniform throughout the operating range of the scale. Friction between the teeth of the rack and pinion is further reduced by mounting the rack for slight lateral movement, such movement being limited by the side members 55 and 56. Disengagement from the pinion due to edgewise movement of the rack is prevented by a projection 61 formed integrally with the web 46ª which overlies the rack.

The motion-transmitting arm 50 is arranged to follow the movements of the scale lever 26 solely through the action of gravity. To this end, the arm is positioned so as to extend over the free end of the lever and is provided with means adapted to rest on the bearing surface provided by the lug 33 to support the arm. In the preferred form shown in Figs. 6 and 7, this means comprises a bracket 62 having spaced legs 63 and 64 adapted to straddle the arm 50, said bracket being pivotally connected to the arm by means of a pin 65. The bracket carries on its lower end a roller 66 adapted to engage the lug 33 and thus support the weight of the arm 50 and rack 58. The roller permits relative movement of parts with a minimum of friction, thereby enabling the indicator mechanism to respond quickly and accurately to movements of the scale levers.

After each scale is assembled, it is necessary to adjust the motion-transmitting mechanism to enable the indicator to respond properly to movements of the weighing mechanism. In order to facilitate this adjustment, means is provided for shifting the position of the roller 66 relative to the pivotal point of the arm 50 to adjust the effective length of the arm. This means comprises a pair of adjusting screws 67 and 68 threaded into the upper portion of the bracket and arranged to engage a shouldered portion 69 of the arm. The screws are located on opposite sides of the pivot pin 65 so that when the screw 67 is turned in one direction and the screw 68 in the other direction, the roller 66 will be moved toward the pivot 51 of the arm. Movement of the screws in the opposite direction will increase the distance between the roller and the pivot 51. Thus, by lengthening or shortening the effective length of the arm, the movements imparted to it and hence to the indicator drum may be coordinated accurately with the movement of the scale levers to insure accurate registration throughout the range of the scale.

Accurate registration is further insured by supporting the pointer 48 on the frame structure rather than on the platform or housing as has heretofore been the practice. Means is also provided for adjusting the position of the pointer relative to the dial to facilitate the setting of the zero point of the indicator. Referring to Figs. 2 and 5, the pointer is preferably formed of sheet metal and comprises an elongated arm 70 terminating at its lower end in a relatively wide, flat member 71 bent at right angles to the arm. The upper portion of the member 71 is bent in to lie substantially parallel to the arm so as to provide spaced bearings for pivot pin 72 carried by an extension 73 of the frame 46. The member 71 has spaced apertures for receiving the bent end of a rod 74 which extends rearwardly through a suitable aperture 75 in the web 18 and through the rear wall 12 of the base. The projecting end of the rod 74 is threaded to receive a nut 76 (Fig. 3) which bears against the wall 12. A compression spring 77 interposed between the member 71 of the pointer and the web 18 tends to move the pointer in a clockwise direction, this movement being opposed by the nut bearing against the wall 12. Thus, by rotating the nut to increase or decrease the effective length of the rod, the pointer 48 may be shifted relative to the dial to coincide with the zero position thereof.

In the use of the scale, the platform B is subjected to the weight of the person or object to be weighed. The pressure upon the platform is transmitted through the bearings 40 to the levers 26 and 27. The free end of the lever 26 carrying the lug 33 is thereby depressed against the tension of the resistor springs 32, the movement of the lever being proportional to the weight on the platform. Depression of the lug 33 permits the free end of the arm 50 to fall, the arm rocking on its pivot in a clockwise direction and thereby shifting the rack 58 relative to the pinion 59. The rack rotates the pinion and associated dial drum 44 relative to the pointer 48 whereby the weight on the platform is indicated. Since actual engagement between the motion-transmitting arm and lug 33 is effected through the roller 66, friction between the parts is reduced to a minimum, thus decreasing wear and enabling the scale to function accurately over a long period of use. Moreover, since the motion-transmitting arm 50 is arranged to follow the movements of the lever 26 solely through the action of gravity, the indicator mechanism is protected from injury through sudden or violent movements of the platform.

Adjustment of the motion-transmitting mechanism to properly coordinate the movements of the dial with those of the lever 26 may be quickly and easily made by varying the angular position of the bracket 62 relative to the arm 50. The adjustment, when made, is permanently retained. Adjustment of the zero position of the dial, however, is effected solely through the shifting of the pointer 48, thereby avoiding any tampering with the motion-transmitting mechanism, once the initial adjustment is made, and permitting the use of a mechanism of simple and sturdy construction.

I claim as my invention:

1. In a weighing scale, in combination, an indicator, a weighing mechanism including a lever fulcrumed at one end and spring-suspended at the free end, a platform supported on said lever and adapted to depress the free end of the lever in response to weight placed thereon, and means for transmitting the movements of said lever to said indicator comprising an arm pivoted at one end, means supporting said arm on the free end of said lever including a roller mounted intermediate the ends of the arm, said roller being held in engagement with the lever solely by gravity and permitting relative movements of the arm and lever with a minimum of friction, and means operatively connecting the free end of said arm with said indicator.

2. In a weighing scale, in combination, an indicator, a weighing mechanism including a lever fulcrumed at one end and spring-suspended at the free end, a platform supported on said lever and adapted to depress the free end of the lever in response to weight placed thereon, and means for transmitting the movements of said lever to said indicator comprising an arm pivoted at one end and operatively connected at the other end with said indicator, a member mounted on said arm at a point intermediate the ends thereof and engageable with said lever to support the arm, and means for adjusting said member relative to said arm to vary the response of the indicator to the movements of said lever.

3. In a weighing scale, in combination, an indicator, a weighing platform, weighing mechanism supporting said platform including a member adapted to be moved a distance proportional to the weight on said platform, means for transmitting the movements of said member to said indicator comprising an arm pivoted at one end and having a rack at its other end operative to actuate the indicator when the arm is rocked on its pivot, an element pivoted intermediate the ends of said arm, a roller on said element engageable with said member for rocking the arm on its pivot in response to movements of the member, and adjusting means for rocking said element on its pivot to shift said roller relative to the pivotal point of said arm whereby to vary the rate of response of the indicator to the movements of said member.

4. In a weighing scale, in combination, an indicator having a rotatable dial and a driving pinion for the dial, a weighing mechanism including a lever fulcrumed at one end and spring-suspended at the free end, a platform supported on said lever and effective to depress the free end of the lever in accordance with the weight imposed on the platform, a bearing surface formed on said lever adjacent its free end, and means for transmitting the movements of said lever to said indicator comprising a pivoted arm, a supporting member on said arm engaging said bearing surface to support the arm, and a rack pivoted on said arm and engaging said pinion, said supporting member and said rack being respectively held in engagement with said bearing surface and said pinion solely by gravity.

5. In a weighing scale, in combination, an indicator having a rotatable dial and a driving pinion for the dial, a weighing mechanism including a lever fulcrumed at one end and spring-suspended at the free end, a platform supported on said lever and effective to depress the free end of the lever in accordance with the weight imposed on the platform, a bearing surface formed on said lever adjacent its free end, and means for transmitting the movements of said lever to said indicator comprising a pivoted arm, means on said arm engaging said bearing surface to support the arm, an arcuate rack pivoted on the other end of said arm and arranged to engage said pinion, and a counterweight on said rack effective to hold the rack in mesh with said pinion.

6. In a weighing scale, in combination, an indicator having a rotatable dial and a driving pinion for the dial, a weighing mechanism including a lever fulcrumed at one end and spring-suspended at the free end, a platform supported on said lever and effective to depress the free end of the lever in accordance with the weight imposed on the platform, a bearing surface formed on said lever adjacent its free end, and means for transmitting the movements of said lever to said indicator comprising a pivoted arm, an arcuate rack mounted on said arm and engaging said pinion, a bracket pivoted on said arm having a roller engageable with said bearing member to support the arm, and means for rocking said bracket about its pivot to vary the effective length of the arm and thereby vary the response of the indicator to the movements of said lever.

7. In a weighing scale, in combination, a base, a weighing mechanism including a lever fulcrumed on said base, a platform supported by said lever, spring means connected between said frame and said lever to counterbalance a weight on said platform, weight indicating means mounted on said base, motion-transmitting means interposed between said lever and said indicating means comprising an arm pivoted at one end on said frame and operatively connected with said indicating means, means on said arm spaced from the pivoted end thereof for engaging said lever to support the arm, and means for shifting the position of said supporting means relative to the pivoted end of the arm to vary the turning movement imparted to the arm by movement of said lever whereby to properly coordinate the operation of the indicator with the movement of the lever under the influence of the weight on said platform.

8. In a weighing scale, in combination, an indicator, a weighing mechanism including a lever fulcrumed at one end and spring-suspended at the free end, a platform supported on said lever and adapted to depress the free end of the same in response to a weight placed thereon, means for transmitting the movements of said lever to said indicator comprising an arm pivoted at one end, means on the arm located at a point spaced from said pivot and coacting with the free end of the lever to support the arm and to provide an impositive connection between the arm and the lever, said impositive connection causing the arm to be actuated solely by gravity in following the downward movement of the lever, and means operatively connecting the arm to said indicator.

9. In a weighing scale, in combination, a base, weighing mechanism disposed within said base, a weighing platform supported on said mechanism and overlying the base, an indicator including a drum-shaped dial mounted on the base for rotation about a horizontal axis to indicate the weight of an object on the platform, said drum being of relatively large diameter and arranged to project substantially above the level of the platform, a pointer cooperating with said drum in indicating weight, a pointer supporting arm pivoted on the base, a spring tending to rock said arm and thus move the pointer relative to the dial, and adjustable means for limiting the movement of the arm to determine the position of the pointer relative to the dial.

10. In a weighing scale, in combination, a hollow rectangular base, weighing mechanism disposed within said base, a weighing platform supported on said mechanism and overlying the base, weight indicating mechanism including a shaft journaled on said base and operatively connected with the weighing mechanism, an indicator drum fast on said shaft, a pointer adapted to cooperate with said indicator drum in indicating the weight on the platform, means pivotally supporting said pointer to rock about an axis substantially parallel to the axis of the drum, and means accessible from outside the base for rocking said pointer relative to the drum to adjust the zero position of the scale.

11. A weighing scale adapted to be assembled from a plurality of component unitary structures comprising, a generally rectangular portion forming a base unit, a weighing mechanism enclosed within said base and supported thereby, a platform removably supported on said weighing mechanism and overlying said base, an indicator mechanism mounted on said base including a rotatable drum dial and gravity actuated motion-transmitting mechanism adapted to cooperate with said weighing mechanism to position said dial, a pointer pivoted on the base and cooperating with said dial, a spring tending to rock said pointer about its pivot, a rod connecting between the pointer and the base to limit the movement of the pointer by said spring, and means for adjusting the effective length of said rod to vary the position of the pointer with respect to said dial.

MARIUS H. HANSEN.